(12) United States Patent
Huber

(10) Patent No.: US 6,687,205 B1
(45) Date of Patent: Feb. 3, 2004

(54) PARALLEL CODED SPREAD SPECTRUM COMMUNICATION FOR DATA STORAGE

(75) Inventor: William D. Huber, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/325,692

(22) Filed: Jun. 2, 1999

Related U.S. Application Data

(60) Provisional application No. 60/088,614, filed on Jun. 9, 1998.

(51) Int. Cl.$^7$ .................................................. G11B 7/00
(52) U.S. Cl. ................................ 369/47.19; 369/59.27; 369/124.04; 369/124.06
(58) Field of Search .......................... 369/47.15, 47.16, 369/47.19, 47.2, 59.27, 59.26, 124.04, 124.05, 124.06, 124.09; 360/59, 66, 68, 56; 375/141, 332; 370/479, 480; 386/94, 95

(56) References Cited

U.S. PATENT DOCUMENTS

| | | | |
|---|---|---|---|
| 2,292,387 A | 8/1942 | Markey et al. ................. 250/2 |
| 4,202,017 A | 5/1980 | Geffon et al. .................. 360/45 |

(List continued on next page.)

FOREIGN PATENT DOCUMENTS

| | | |
|---|---|---|
| EP | 0 051 343 A | 5/1982 |
| EP | 0 139 925 A | 5/1985 |

(List continued on next page.)

OTHER PUBLICATIONS

Letter to Don Huber date Apr., 1997 including "The Hedy Lamarr patent saga in spread–spectrum communications" w/attachment, 9 pp.

(List continued on next page.)

Primary Examiner—Thang V. Tran
(74) Attorney, Agent, or Firm—Kirk A. Cesari

(57) ABSTRACT

Presently, almost all commercially available data storage systems use saturation recording and binary signaling schemes. Earlier data channels for storage systems utilized various forms of bit by bit peak detection. More recently, various forms of PRML (partial response maximum likelihood) or DFE (decision feedback equalization) have appeared in products. These improvements are still limited by the fact that the storage data channel is a saturation channel, and as such, has a significantly reduced information handling capacity compared to a linear data channel.

Recording media defects are currently mapped out at the factory and skipped under normal device usage, while remaining errors are corrected by error correction code. However, at higher aerial densities, defects in the media tend to become a greater problem.

The above-incorporated applications teach a linearization technique for linearizing magnetic recording channels without suffering signal to noise loss and not suffering bandwidth loss. Given this, the objective is to take the channel recording as close as possible to the theoretical capacity limit.

Spread spectrum communication systems are also known. As originally designed by actress Heddy LaMar and musician George Antheil and described in U.S. Patent "Secret Communication System", U.S. Pat. No. 2,292,387 of Aug. 11, 1942, the frequency of the carrier was pseudo randomly changed in discrete steps to spread the spectrum at the transmitter. The received carrier frequencies were demodulated out by synchronization with the known transmitted pseudo random modulation to despread the spectrum. To a non-synchronized receiver, the spread spectrum signal looked like noise, but the intended receiver can despread the spectrum and recover the information. An added benefit to communication systems was robustness against narrow band jamming as well as atmospheric fading and multipath cancellations.

The present inventor has recognized that this communication system can be adapted to efficiently store linearized data in a magneto-optical storage system.

7 Claims, 9 Drawing Sheets

U.S. PATENT DOCUMENTS

| | | | | |
|---|---|---|---|---|
| 4,965,873 | A | | 10/1990 | White .......................... 360/41 |
| 5,124,861 | A | | 6/1992 | Shimotashiro et al. ......... 360/39 |
| 5,475,672 | A | | 12/1995 | Le Carvennec .......... 369/275.3 |
| 5,682,457 | A | * | 10/1997 | Woo et al. ..................... 386/95 |
| 6,246,802 | B1 | * | 6/2001 | Fujihara et al. ............. 382/276 |
| 6,330,393 | B1 | * | 12/2001 | Usui et al. ..................... 386/94 |
| 6,345,146 | B1 | * | 2/2002 | Sako et al. ................... 386/94 |
| 6,363,100 | B1 | * | 3/2002 | Ohki et al. ................. 375/141 |
| 6,373,859 | B1 | * | 4/2002 | Jedwab et al. .............. 370/479 |

FOREIGN PATENT DOCUMENTS

| | | | |
|---|---|---|---|
| EP | 0 522 543 | A | 1/1993 |
| EP | 0 631 280 | A | 12/1994 |
| JP | 07 220317 | A | 8/1985 |
| JP | 62 049781 | A | 3/1987 |
| JP | 06 195786 | A | 7/1994 |
| JP | 07 029239 | A | 1/1995 |
| SU | 1 569 876 | A | 6/1990 |

OTHER PUBLICATIONS

Couey, Anna; Internet Article Entitled "Recognition At Last: Hedy Lamarr & George Antheil receive EFF Award" dated Jul. 1, 1998; 2 pp.; http://www.microtimes.com/166/coversidebar.html.

Couey, Anna; Internet Article Entitled "The Birth of Spread spectrum; How 'The Bad Boy of Music' And 'The Most Beautiful Girl in the World' Catalyzed a Wireless revolution—In 1941" dated Jul. 1, 1998; 6 pp.; http://www.microtimes.com/166/coverstory166.html.

Viterbi, Andrew J.; *CDMA Principles of Spread Spectrum Communication*; Addison–Wesley Longman, Inc., 1995; pp. vii–xi.

Article Entitled, "The Historian's Column"; IEEE Information Theory Society Newsletter; Dec. 1998; pp. 14 and 15.

Slaughter, T., Editor.; *Digital Communictions*; 1983; pp. 71–73.

Huber, W. Don; "A Signal Processing Advantage Associated With Magneto–Optical Data Channels"; Manuscript dated Apr. 1, 1997; 3 pp.

Sklar, Bernard; *Digital Communications: Fundamentals and Applications*; Prentice Hall, 1988, pp. 536–545.

Huber, W. Don; Manuscript Entitled "Addendum: Efficient Linearization of Saturation Channel"; dated Sep. 30, 1999; 1 page.

Seagate Technology, Inc. Confidential Interoffice Memorandum (with Attachments); To: Tom Murnan; From: Bruce Johnson; Dated Oct. 4, 1992; Subject: Frequency domain recording (FDR); 15 pp.

French, Catherine A., et al.; Article Entitled "Bounds on the Capacity of a Peak Power Constrained Gaussian Channel"; IEEE Transactions on Magnetics, vol. 24, No. 5, Sep. 1988; pp. 2247–2262.

Bertram, H. Neal; Article Entitled "Long Wavelength AC Bias Recording Theory"; IEEE Transactions on Magnetics, vol. Mag–10, No. 4, Dec. 1974; pp. 1039–1048.

Eiling, Aloys; Article Entitled "Computer Simulation of Bias Recording"; IEEE Transactions on Magnetics, vol. 24, No. 5, Sep. 1988; pp. 2235–2246.

Jacoby, George V.; Article Entitled "High Density Recording with Write Current Shaping" IEEE Transactions on Magnetics, vol. Mag–15, No. 3, Jul. 1979; pp. 1124–1130.

McCown, Donald P., et al.; Article Entitled "Comparative Aspects of AC Bias Recording"; IEEE Transactions on Magnetics, vol. Mag–17, No. 6, Nov. 1981; pp. 3343–3345.

Mintzer, Fred, et al; Research Report Entitled "Experiments on the Use of FDDT for AC–Bias Disk Recording"; IBM Research Division; RC 9429 (#41644) Jun. 16, 1982; Communications/Engineering technology; 6 pp. and pp. 7–19.

Lin, Gang Herbert, et al.; Article Entitled "Transition Noise Spectral Measurements in Thin Film Media"; IEEE transactions on Magnetics, vol. 30, No. 6, Nov. 1994; pp. 3987–3989.

Figure 25(b) re. Kerr Rotation and Magnetic Field; p. 126; and Definitions of Figures 24–30; p. 79.

Fu, Hong, et al.; Article Entitled "Dielectric tensor characterization and evaluation of several magneto–optical recording media"; J. appl. Phys. 78 (6), Sep. 15, 1995; pp. 4076, 4077, 4079, 4081, 4083, 4085, 4087 & 4089.

Huber, W. Don; Article Entitled "Maximal Areal Density for PRML Data Channels"; IEEE Transactions on Magnetics, vol. 32, No. 5, Sep. 8, 1996; pp. 3956–3958.

Webb, William, et al; *Modern Quadrature Amplitude Modulation: Principles and Applications for Fixed and Wireless Communications*; Pentech and IEEE Press; 9 Contents pages attached.

Weathers, Anthony D.; Dissertation Entitled "Modulation Techniques for Digital Magnetic Recording" for the University of California, San Diego; 1990; pp. 116–157.

Forney, Jr. G. David, et al.; Aritcle Entitled "Combined Equalization and Coding Using Precoding"; IEEE Communications Magazine; December 1991; pp. 25–34.

Kobayashi, M., et al.; Article Entitled "Beyond $1\mu m^2$/bit High Density Recording With Improved QAM Technique"; IEEE Transactions on Consumer Electronics, vol. 37, No. 3, Aug. 1991; pp. 283–290.

Wong, Bennett C.; Article Entitled "A 200–MHz All–Digital QAM Modulator and Demodulator in 1.2–$\mu$m CMOS for Digital Radio Applications"; IEEE Journal of Solid–State Circuits, vol. 26, No. 12, Dec. 1991; pp. 1970–1980.

Anonymous: "Maximizing the Output from Buried Servo by Servo Write Current Shaping", IBM Technical Disclosure Bulletin, vol. 24, No. 3, Aug. 1981, pp. 1479–1480.

"AC–BIAS Magnetic Recording of Data", IBM Technical Disclosure Bulletin, vol. 32, No. 7, Dec. 1, 1989, pp. 286,288.

* cited by examiner

PARALLEL CODED SPREAD SPECTRUM COMMUNICATION FOR DATA STORAGE

CROSS-REFERENCE TO RELATED APPLICATIONS

The present application claims priority to Provisional Application No. 60/088,614 filed Jun. 9, 1998, which is incorporated herein by reference. The application and invention disclosed herein is especially useful in combination with the co-pending application Ser. No. 09/325,012 filed Jun. 2, 1999, entitled "Efficient Linearization of Saturation Channels" and co-pending application Ser. No. 09/324,616 filed Jun. 2, 1999 entitled "A Magneto-Optical Recording System Employing Linear Recording and Playback Channels", respectively, invented by Donald W. Huber and others and assigned to the assignee of this application and incorporated herein by reference, and having the same filing date as the application.

BACKGROUND OF THE INVENTION

Presently, almost all commercially available data storage systems use saturation recording and binary signaling schemes. Earlier data channels for storage systems utilized various forms of bit by bit peak detection. More recently, various forms of PRML (partial response maximum likelihood) or DFE (decision feedback equalization) have appeared in products. These improvements are still limited by the fact that the storage data channel is a saturation channel, and as such, has a significantly reduced information handling capacity compared to a linear data channel.

Recording media defects are currently mapped out at the factory and skipped under normal device usage, while remaining errors are corrected by error correction code. However, at higher aerial densities, defects in the media tend to become a greater problem.

The above-incorporated applications teach a linearization technique for linearizing magnetic recording channels without suffering signal to noise loss and not suffering bandwidth loss. Given this, the objective is to take the channel recording as close as possible to the theoretical capacity limit.

Spread spectrum communication systems are also known. As originally designed by actress Heddy LaMar and musician George Antheil and described in U.S. Patent "Secret Communication System", U.S. Pat. No. 2,292,387 of Aug. 11, 1942, the frequency of the carrier was pseudo randomly changed in discrete steps to spread the spectrum at the transmitter. The received carrier frequencies were demodulated out by synchronization with the known transmitted pseudo random modulation to despread the spectrum. To a non-synchronized receiver, the spread spectrum signal looked like noise, but the intended receiver can despread the spectrum and recover the information. An added benefit to communication systems was robustness against narrow band jamming as well as atmospheric fading and multipath cancellations.

The present inventor has recognized that this communication system can be adapted to efficiently store linearized data in a magneto-optical storage system.

SUMMARY OF THE INVENTION

An efficient linearization of the saturation channel of a storage system is enabled by the techniques disclosed in the above-referenced application of Huber, Smith and Altman entitled "Efficient Linearization of Saturation Channels" assigned to the assignee of this invention. The minimal loss of signal to noise ratio and no loss of bandwidth is achieved by this linearization process.

The novel system disclosed herein, based on spread spectrum techniques which have not previously been applied to recording systems, takes the incoming data stream and encodes it to N-parallel paths, each storing one/N of the incoming data rate. The system then orthogonally modulates each into spread spectra, and overlays each on the same frequency spectrum. This provides a bandwidth and signal to noise ratio efficiency of co-division multiple access systems. Moreover, robustness can be traded off against transmission efficiency by adjusting the number of coded layers of transmission.

This invention provides a means of maximization of data channel efficiency to near the theoretical capacity limits while simultaneously providing a means of increasing robustness against recording media defects. The invention enables a potential of as much as doubling of present product capacity without requiring an increase in the head-disc component performance; moreover, the robustness against defects in the media is increased.

Other features and advantages of the present invention will become apparent to a person of skill in the art who studies the present invention disclosure. Therefore, the scope of the present invention is to be limited only by the following claims.

DESCRIPTION OF A PREFERRED EMBODIMENT

The present invention is especially useful in recording linearized data on the tracks of a magneto-optical disc drive. Therefore, the present application will begin with a brief description of a typical magneto-optical disc drive system and of a signal linearizing data channel. This will be followed by a description of a typical parallel coded spread spectrum data channel. The spread spectrum system itself is not unique as it is known in communication technology, as taught, for example, in A. J. Viturbi, "CDMA: Principles of Spread Spectrum Communication" (Edison-Wesley 1995), incorporated herein by reference.

Figure 1:
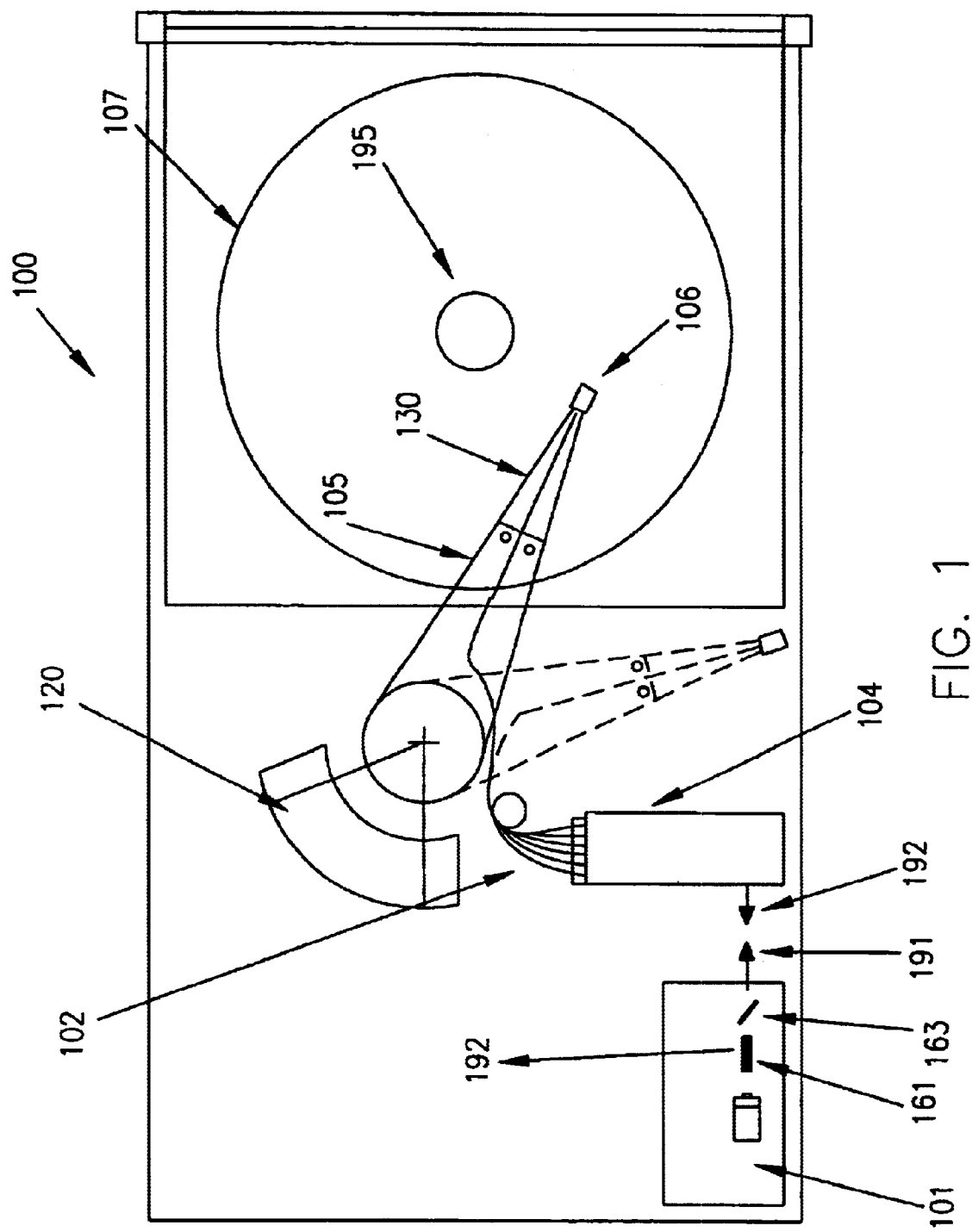
FIGS. 1, 2 and 3a–3g are diagrams which illustrate the elements of an exemplary MO storage and retrieval system in which the present invention is useful.

Referring in detail now to the drawings wherein similar parts of the invention are identified by like reference numerals, there is seen in FIG. 1 a diagram showing a magneto-optical data storage and retrieval system. In a preferred embodiment, a magneto-optical (MO) data storage and retrieval system 100 includes a set of Winchester-type flying heads 106 that are adapted for use with a set of double-sided MO disks 107 (only one flying head and one MO disk shown). The set of flying heads 106 (hereinafter referred to as flying MO heads) are coupled to a rotary actuator magnet and coil assembly 120 by a respective suspension 130 and actuator arm 105 so as to be positioned over upper and lower surfaces of the set of MO disks 107. In operation, the set of MO disks 107 are rotated by a spindle motor 195 so as to generate aerodynamic lift forces between the set of flying MO heads 106 and so as to maintain the set of flying MO heads 106 in a flying condition approximately 15 micro-inches above the upper and lower surfaces of the set of MO disks 107. The lift forces are opposed by equal and opposite spring forces applied by the set of suspensions 130. During non-operation, the set of flying MO heads 106 are maintained statically in a storage condition away from the surfaces of the set of MO disks 107.

System 100 further includes: a laser-optics assembly 101, an optical switch 104, and a set of optical fibers 102. The laser-optics assembly 101 includes a polarized diode laser source 231 operating an optical power sufficient for writing and reading information using the set of MO disks 107. The laser optics assembly 101 provides an outgoing laser beam 191 (with reference to laser source 231) that passes through a polarizing beam splitter 161 and quarter-wave plate 163 before entering the optical switch 104. In the exemplary embodiment, each of the set of optical fibers 102 are coupled through a respective one of the set of actuator arms 105 and suspensions 130 to a respective one of the set of flying MO heads 106.

Figure 2:
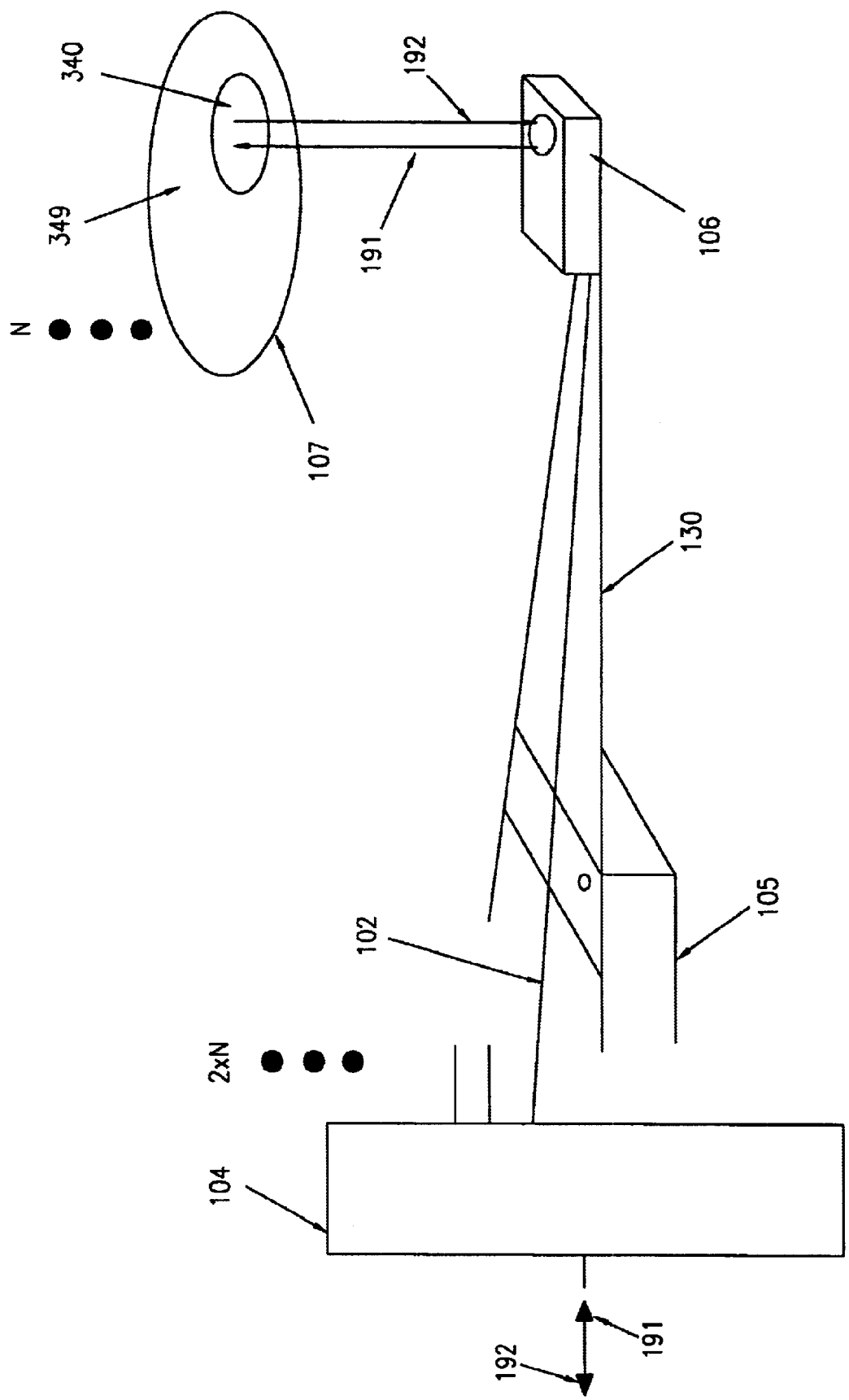

FIG. 2 is a diagram showing a representative optical path. In a preferred embodiment, a representative optical path as shown in FIG. 2 includes: the optical switch 104, one of the set of optical fibers 102, and one of the set of flying MO heads 106. The optical switch 104 provides sufficient degrees of selectivity for directing the outgoing laser beam 191 (with reference to laser source 231) to enter a respective proximal end of a respective optical fiber 102. The outgoing laser beam 191 is directed by the optical fiber 102 to exit the optical fiber 102 so as to pass through the flying MO head 106 onto a surface recording/storage layer 349 of a respective MO disk 107. As described below, according to this invention, the disk 107 uses magnetic super-resolution (MSR) technology and MR technology.

During track following of data tracks on the disk 107, the system of this invention utilizes the laser to achieve enhanced track following capability, as well as to selectively heat the media where the data is to be accessed. The outgoing laser beam 191 is reflected from the MO disk 107 as a reflected laser beam 192 and is conveyed back by optical elements on the flying MO head 106, the optical fiber 102, and the optical switch to the laser optics assembly 101 (FIG. 1) via the optical switch 104. An amplitude of the reflected laser beam 192 passes through the quarter-wave plate 163 and the polarizing beam splitter 161 and is used for deriving phase change track following signals for use by conventional phase change track-following circuitry (not shown).

Figure 3A:
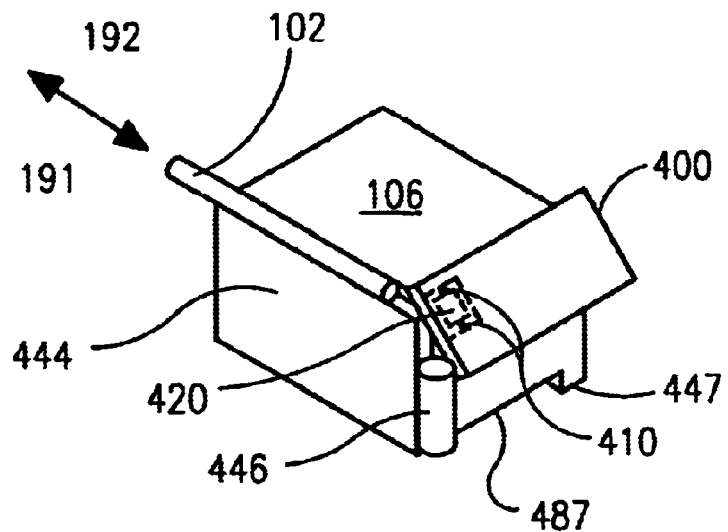

FIGS. 3a–f are diagrams showing the flying magneto-optical head of the magneto-optical data storage system in a perspective, a side cross-sectional, an expanded cross-section, a side, a front, a bottom, and a rear view, respectively. In FIG. 3a, the flying MO head 106 is shown for use above a surface recording layer 349 of one of the set of MO disks 107. The flying MO head 106 includes: a slider body 444, an air bearing surface 447, a reflective substrate 400, objective optics 446, a conductor 460, and a flux guide 462. In one embodiment, the flux guide 462 includes a permalloy flux guide. The slider body 444 is dimensioned to accommodate the working distances between the objective optics 446, the optical fiber 102, and the substrate 400. The reflective substrate 400 may include a reflective surface which is aligned so as to direct the outgoing laser beam 191 to the surface recording/storage layer 349. Although the slider body 444 may include-industry standard "mini", "micro", "nano", or "pico" sliders, alternatively dimensioned slider bodies 444 may also be used.

The optical fiber 102 is coupled to the slider body 444 along an axial cutout 443, and the objective optics 446 is coupled to the slider body 444 along a vertical corner cutout 411. Although in the preferred embodiment the axial cutout 443 is located along a periphery of the slider body, and the vertical cutout 411 is located at a corner of the slider body 444, the axial cutout 443 and the vertical cutout 411 may be located at other positions on the flying MO head 106, for example, between the periphery and a central axis of the flying MO head 106, or, alternatively, along the central axis itself. Those skilled in the art will recognize that positioning the optical fiber 102 and the objective optics 446 at other than along a central axis may function to affect a center of mass of the flying MO head 106 and, thus, its flying dynamics. Accordingly, the point of attachment of the flying MO head 106 to the suspension may require adjustment to compensate for off-center changes in the center of mass of the flying MO head 106. Preferably, the cutouts 443 and 411 may be designed as channels, v-grooves, or any other suitable means for coupling and aligning the optical fiber 102 and objective optics 446 to the flying MO head 106. In the preferred embodiment, the outgoing laser beam 191 traverses an optical path to the recording/storage layer 349 of the MO disk 107 that includes: the optical fiber 102, the reflective element 400, and the objective optics 446. In the preferred embodiment, the optical fiber 102 and the objective optics 446 are positioned within their respective cutouts to achieve focus of the outgoing laser beam 191 within the spot of interest 340 as a focused optical spot 448. The optical fiber 102 and the objective optics 446 may be subsequently secured in place by using ultraviolet curing epoxy or similar adhesive.

As compared to free space delivery of laser light, the optical fiber 102 provides an accurate means of alignment and delivery of the outgoing laser beam 191 to the reflective substrate 400. The optical fiber 102 also provides a low mass and low profile optical path. The low mass of the optical fiber 102 provides a method of delivering light to the optics of the flying MO head 106 without interfering substantially with the operating characteristics of the actuator arm 105 and suspension 130. The low profile of the optical fiber 102 provides the ability to reduce the distance between a set of MO disks 107 without interfering with delivery of laser light to and from the MO disks 107 and/or operation of the flying MO head 106. The optical fiber 102 also appears as an aperture of a confocal optical system for the reflected laser beam 192 and has a large depth resolution along its optical axis and an improved transverse resolution.

Figure 3B:
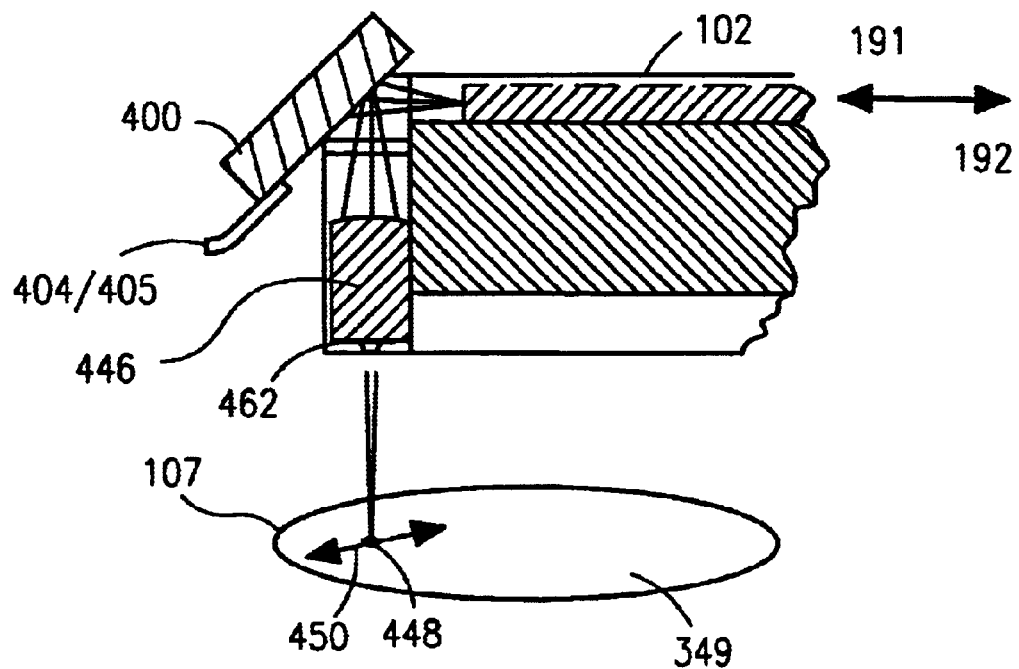
Figure 3C:
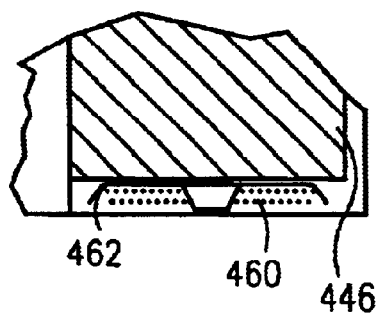
Figure 3D:
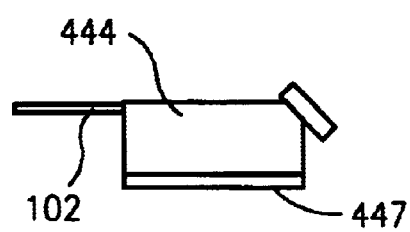
Figure 3G:
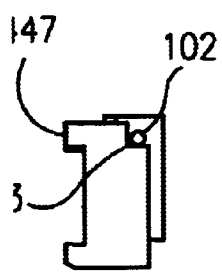
Figure 3F:
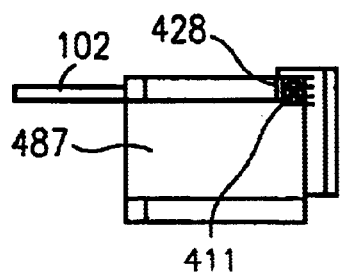
Figure 3E:
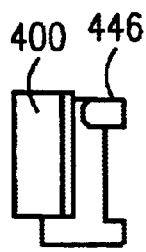

In an exemplary embodiment, the reflective element 400 may comprise a steerable micro-machined mirror assembly. In a preferred embodiment, the steerable micro-machined mirror assembly 400 includes a small reflective central mirror portion 420 (illustrated in FIG. 3a by dashed lines representative of the reflective central mirror portion on a side of the steerable micro-machined mirror assembly 400 opposite to that which is visible). The small size and mass of the steerable micro-machined mirror 400 contributes to the ability to design the flying MO head 106 with a low mass and a low profile. As used in the magneto-optical storage and retrieval system 100, fine tracking and short seeks to a series of nearby tracks may be performed by rotating the reflective central mirror portion 420 about a rotation axis so that the propagation angle of the outgoing laser beam 191 and the reflected laser beam 192 is changed before transmission to the objective optics 446. The reflective central mirror portion 420 is rotated by applying a differential voltage to a set of drive electrodes 404/405 (FIG. 3b). The differential voltage on the electrodes creates an electrostatic force that rotates the reflective central mirror portion 420 about a set of axial hinges 410 and enables the focused optical spot 448 to be moved in the radial direction of the MO disk 107. In the exemplary embodiment, a rotation of approximately ±2 degrees of the reflective central mirror portion 420 is used for movement of the focused optical spot 448 in an approximately radial direction 450 of the MO disk 107 for storage of information, track following, and seeks from one data track to another data track. In other embodiments, other ranges of rotation of the reflective central mirror portion 420 are possible. Coarse tracking may be maintained by adjusting a current to the rotary actuator magnet and coil assembly 120 (FIG. 1). The track following signals used to follow a particular track of the MO disk 107 may be derived using combined coarse and fine tracking servo techniques that are well known in the art. For example, a sampled sector servo format may be used to define tracks. In the prior art, conventional multiple platter Winchester magnetic disk drives use a set of respective suspensions and actuator arms that move in tandem as one integral unit. Because each flying magnetic head of such an integral unit is fixed relative to another flying magnetic head, during track following of a particular magnetic disk surface simultaneous track following of another magnetic disk surface is not possible. In contrast, irrespective of the movement of the set of actuator arms 105 and set of suspensions 130, a set of the steerable micro-machine mirror assemblies 400 of the present invention may be used to operate independently and thus permit track following and seeks so as to read and/or write information using more than one MO disk surface at any given time. Independent track following and seeks using a set of concurrently operating steerable micro-machined assemblies 400 would preferably require a set of separate respective read channel and fine track electronics and mirror driving electronics. In the aforementioned embodiment, because delivery of the outgoing laser beam 191 would preferably require separate diode laser sources 131, an optical switch 104 for switching between each of the separate optical paths would not necessarily be required.

Figure 4:
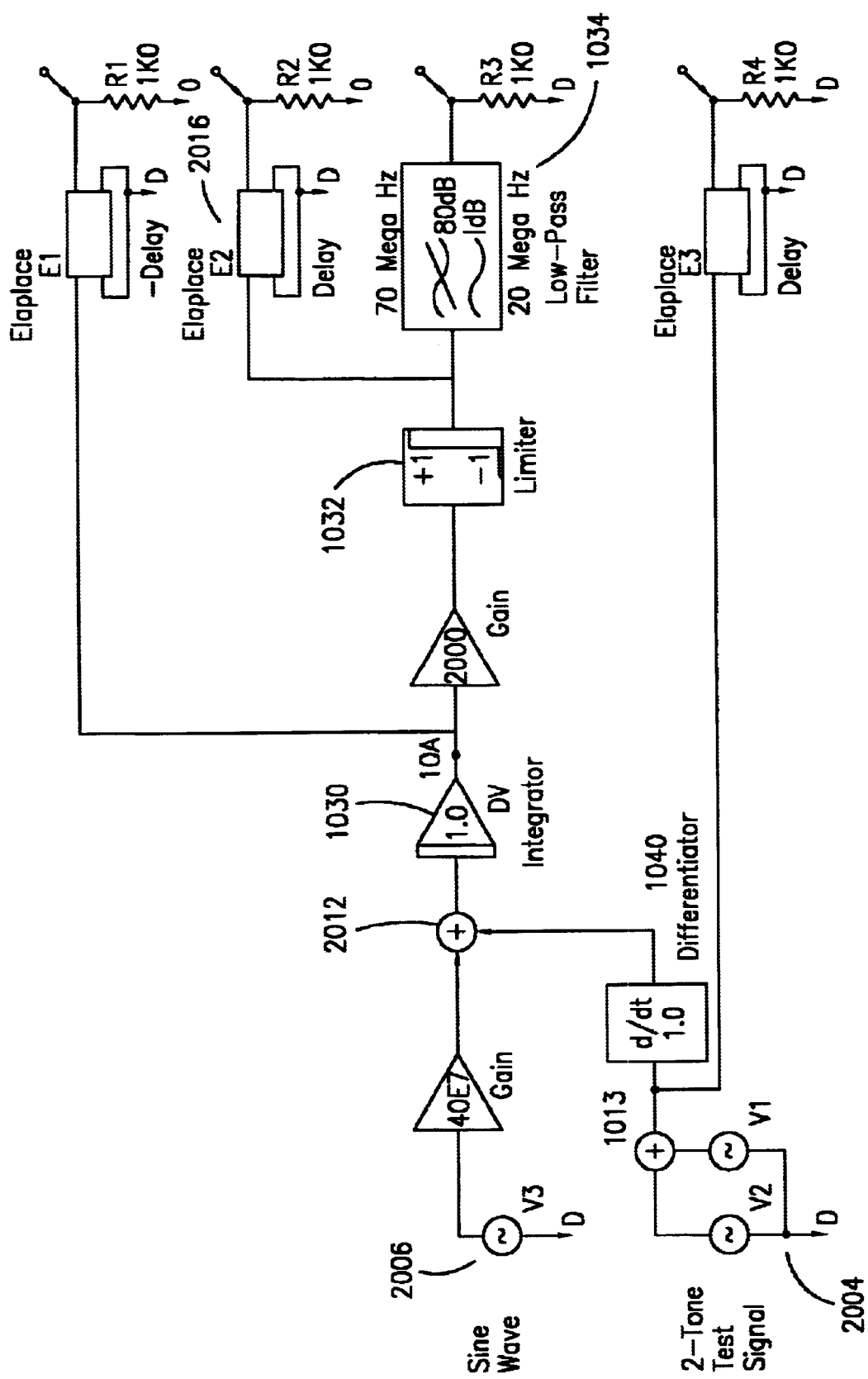
FIG. 4 is a schematic of a recording system model simulation providing 0–100% duty cycle modulation.
Figure 5:
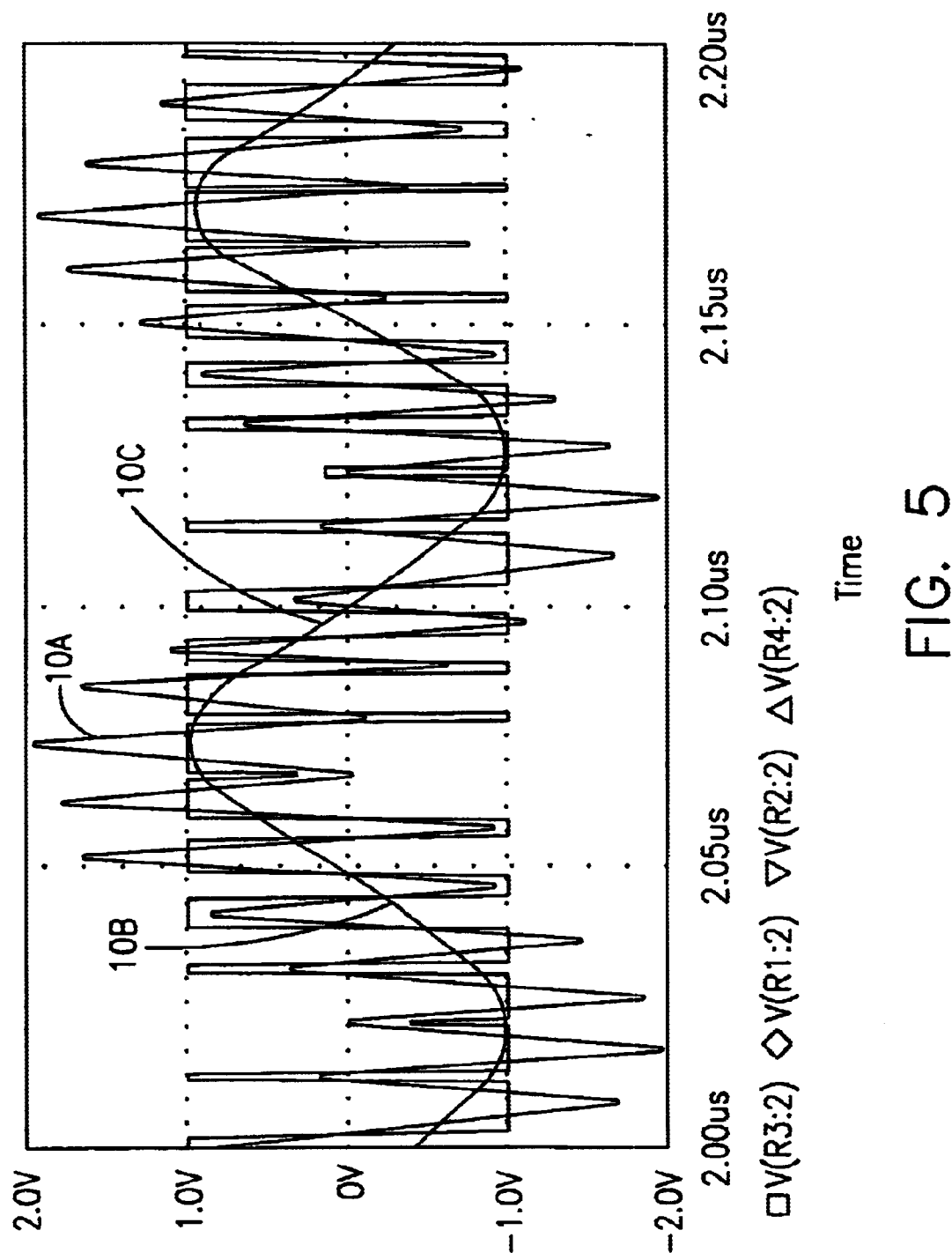
FIG. 5 illustrates waveforms having 0–100% DCM waveforms with zero amplitude loss.
Figure 6:
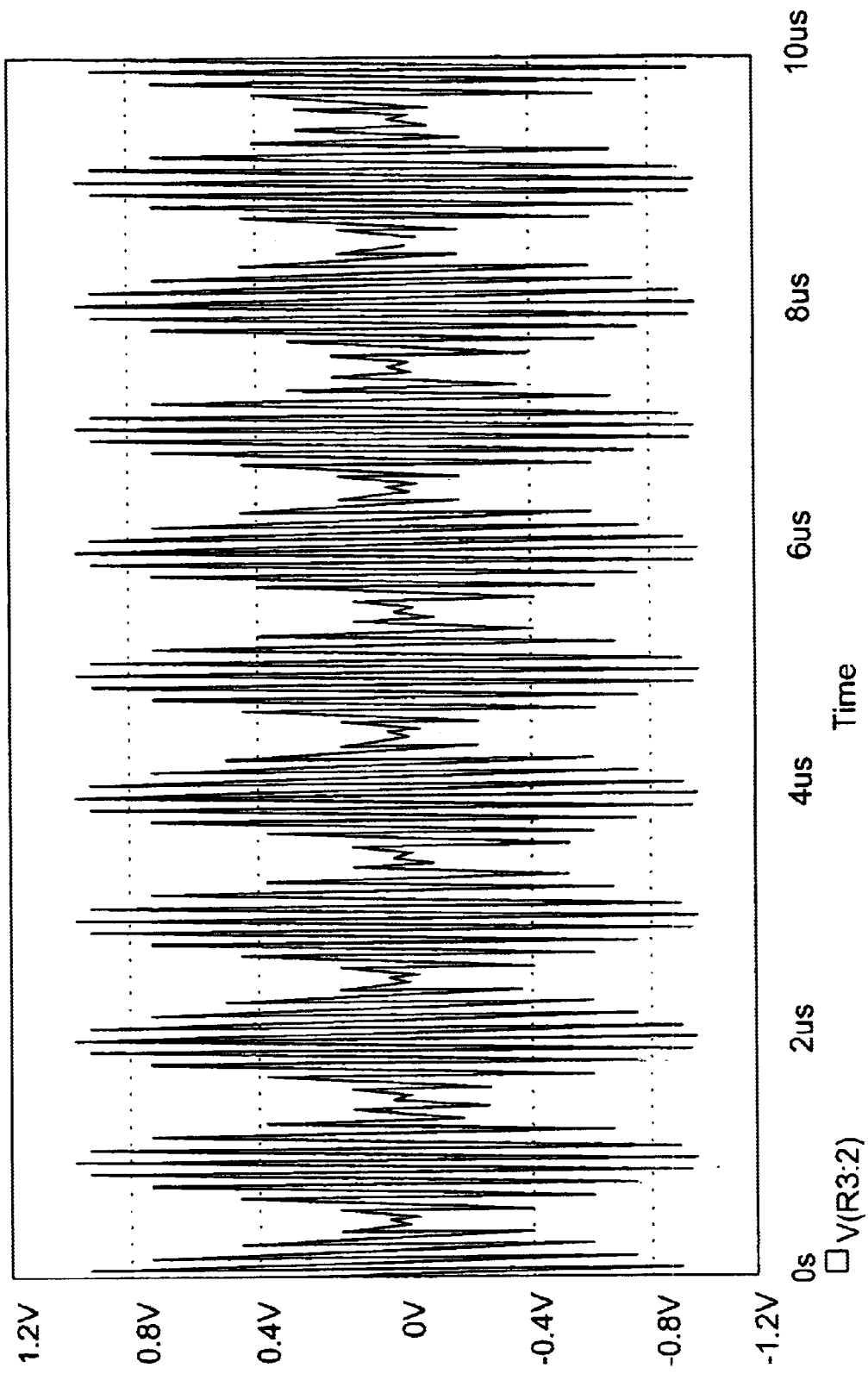
FIG. 6 illustrates a 0–100% DCM two-tone test signal output as generated by the circuitry of FIG. 4
Figure 7:
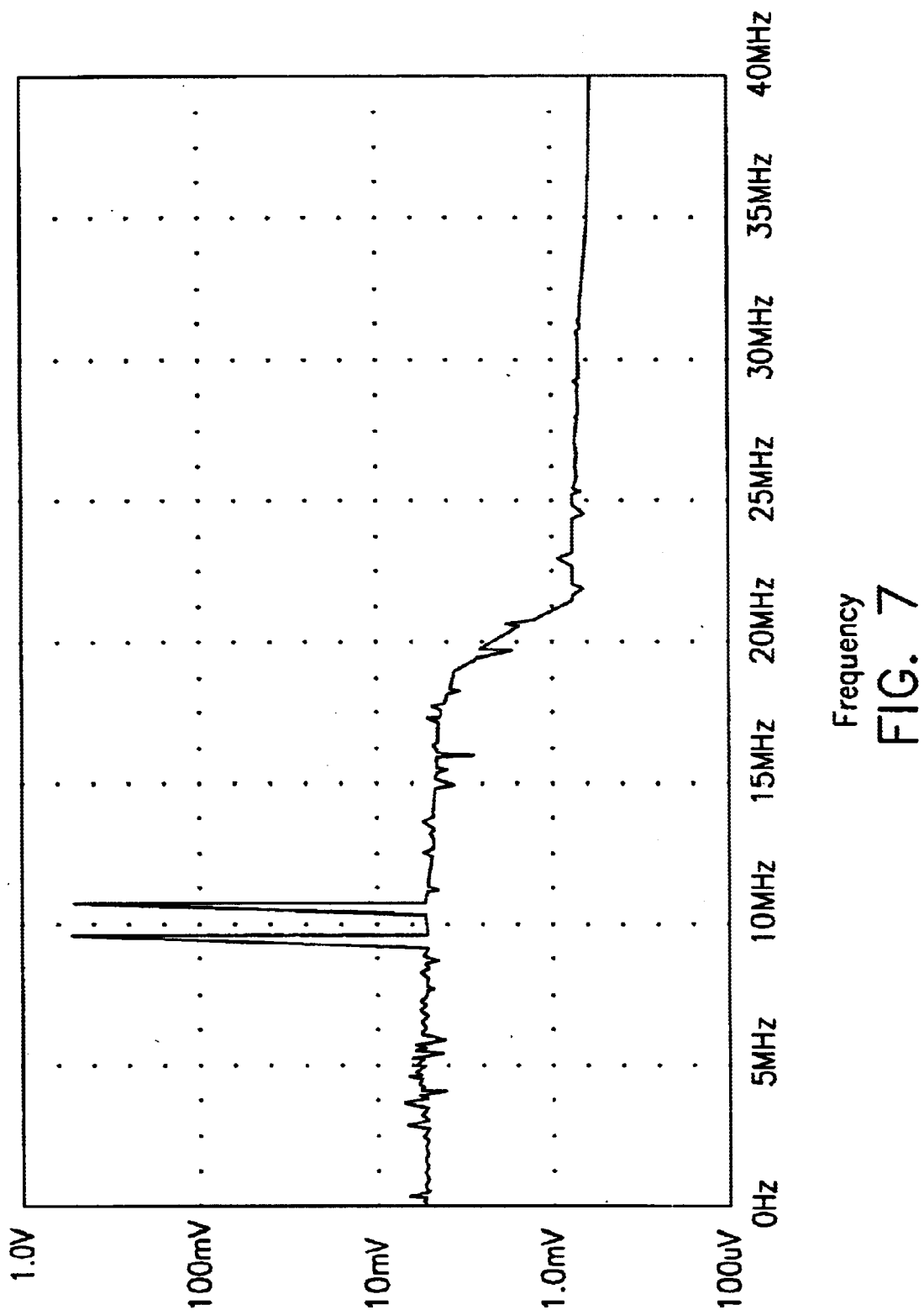
FIG. 7 is a waveform diagram of the spectrum of a two-tone test signal output for 0–100% DCM.

FIGS. 4 and 5 and the waveforms of FIGS. 6 and 7 illustrate an approach to the present invention linearizing a signal to be stored in an MO system.

To avoid the undesirable 6 to 7 dB loss in signal amplitude and SNR (if noise is not increased by the high frequency content of the written waveform) one must preserve full linearity in the proportionality of the baseband signal amplitude with the duty cycle of the two level waveform. One way to do this is to create a triangle wave AC bias component to which is added an analog baseband signal whose peak amplitude equals that of the triangular bias. FIG. 4 shows the simulation diagram for such a system where the triangular "write" current bias waveform is created by integrating a 50% duty-cycle squarewave signal at the bias frequency. The non-linear recording process in modeled by the limiter with small hysteresis. The linear playback process is modeled simply by a low-pass filter. FIG. 6 shows the waveforms generated in this process. The key thing to notice is that the duly cycle of the limiter output reaches 0% to 100% in a manner linearly proportional to the amplitude of the baseband signal.

The simulation circuitry of FIG. 4 begins with wave generator 2006 that could be created by logic circuits as is well known in the art. Summing block 2012 sums in the two-tone sine waves which are differentiated 1040 so that the differentiation mathematically cancels the integration, and the output 10A provides an integrated square wave which is a triangle wave as shown at 10A in FIG. 5.

The point 10B corresponds to the input base band signal which is actually two tones. The combination of a gain of 2,000 preceding a limiter who has a gain of 1 represents a high gain limiter. That output is low pass filtered; the output 10C is simply the other one of these nearly identical sine waves in FIG. 5.

The point is that 10B and 10C have no amplitude loss and are limited only by the amplitude of this limiter 1032 itself, which was plus/minus 1.

The electronic limiter 1404 creates the duty cycle waveform, which is a two-level waveform which drives a write driver 1406 very similar to conventional write drivers now in using saturation recording except that now we have to have higher frequency response or faster rise times so it requires that the write process be a much wider bandwidth and have faster rise time capabilities than the read process.

Figure 8:
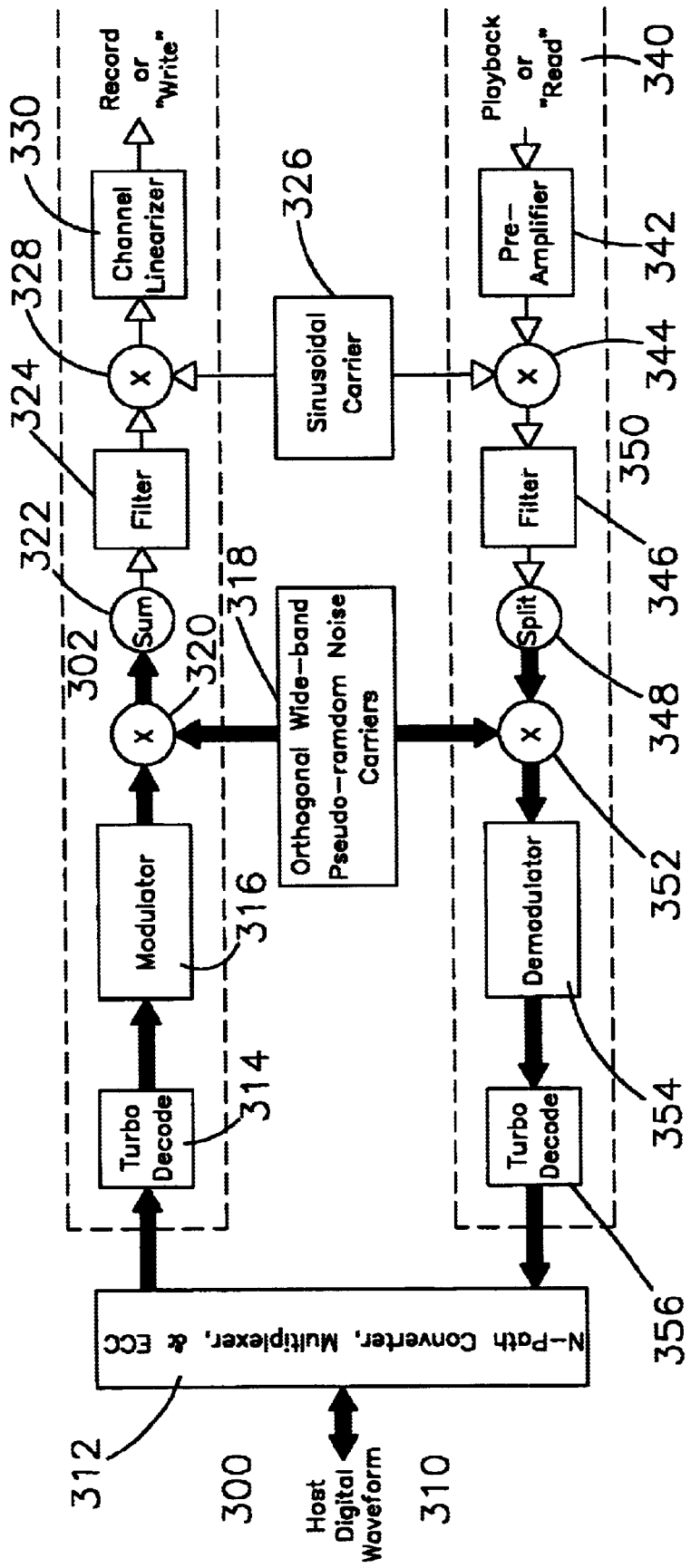
FIG. 8 is a block diagram of the present invention.

FIG. 8 is a block diagram of an MO recording system which accommodates the present invention. The recording system 300 includes a recording channel 302 and a playback channel 350. The recording channel 302 takes the incoming data stream 310 and encodes it into N parallel paths (each with one/N of the incoming data rate). The encoding channel includes therefore an N path converter 312 which also includes a multiplexer and ECC converter, a turbo encoder 314 and modulator 316. The output of the modulator is multiplied by an orthogonal noise generator 318 at multiplier 320. The multiple channels are then summed at summer 322. The output of the summer is filtered at filter 324 and multiplied by a sinusoidal carrier from generator 326 at multiplier 328. The output is linearized in accordance with the principles of the previously-described applications at linearizer 330 and recorded on the disc 207. The playback channel 350 starts with the storage medium 207 which is read by a playback or read head generally indicated at 340. The read back signal is fed to a preamplifier 342 and combined with the same or equivalent sinusoidal signal at multiplier 344 and then pass through a low pass filter 346 to recover the information as described in the above-incorporated application. The signal is then split at splitter 348 into N channels by mixing it with a signal from the orthogonal signal at multiplier 352 and each of the N signals is demodulated at demodulator 354 and decoded at turbo decoder 356.

The reason for adopting the above approach is that, given a linearization technique that allows a linearization of the magnetic recording channel without suffering SNR loss and not suffering band width loss, the objective becomes to get as close as possible to the theoretical capacity limit, also known as the Shannon limit. The best way to do this is by utilizing spread spectrum communications. Generally speaking, the system comprises taking a narrow band analog signal and modulating it in such a way that its signal is spread over a wide band of frequencies, and then taking a second signal and spread it, or lay it over the first signal, but the spreading process is done with orthogonal-coded signals so separation of the channels is maintained. These channels are laid on top of one another in the spectrum, utilizing as many channels as possible, limited only by the signal/noise ratio available in the particular wide band. In so doing, the system approaches the Shannon limit for a given band width and signal/noise ratio that's available, i.e. the theoretical available maximum signal transmission capacity.

As used in this application, spreading means taking your narrow band analog signal and spread its spectrum by modulating it 316 with a pseudo random pattern whose pattern would be itself a binary two-level pattern and would go through a multiplier 320. Incidentally, in the block diagram of FIG. 8, the double lines represent multiple channels. However, for now we are just talking about one channel. This signal would be multiplied 320 by the orthogonal wide band signal 318 called the Walsh function. Walsh functions are made orthogonal over one another. Orthogonal means that the integral of function 1 multiplied by function 2 over a large amount of time is zero. When an orthogonal weight form is multiplied against the narrow band signal, if it's a pseudo random pattern, it spreads the spectrum. So that would form one channel of the many channels output by the multiplier 320; in the digital communication, that would be one out of N bits. To lay down another spread spectrum on top of that, another spreading code is used that's orthogonal to the first spreading code; it is multiplied against the second bit of information, spreading its spectrum, then laid down over the first spectrum. The originals are orthogonal so that they can be unscrambled later in detection scheme 350, all of it in parallel to get all these bits back out. The recording system repeats this layering N times, N being limited by the available signal/noise ratio until the channel is filled up to the Shannon capacity as defined by band width and SNR, and then noise-like waveform is transmitted. While it looks like noise, it's really a composition of all these layered spectrum; then it is heterodyned again to set it up at in some band of frequencies you run it through a linear channel 330; the channel linearizes the duty cycle modulator as explained, and then the linearized composite is recorded to the disc, or tape or whatever magnetic process.

On the receive side, a linear amplifier 350 picks up the composite. At this point, if you did a heterodyne spectrum offset, this would utilize the same signal 326 in a broad band filter 346, recovering all your layered channels. One would then have to split those out 348 and multiply them line by line with the individual orthogonally coded Walsh functions 318. Finally, if the system uses an ECC turbo encoding 314 and decoding 356, that would be applied on the outer loop until the host waveform is recovered.

In summary, the application of spread spectrum principles to this data storage system allows substantially greater data storages in the system.

Other features.

What is claimed is:

1. A recording system comprising:
    a medium for storing a recording signal, and
    a data storage channel for writing data to and reading data from said medium, said storage channel including
        means for spreading the spectrum of data to be stored on said medium,
        a linear recording channel, coupled to the output of the means for spreading the data spectrum, for linearizing the data to be stored, wherein the output of said linear recording channel comprises a sum of said data to be stored and a triangular waveform, and
        means for despreading the spectrum of said data after reading from said medium.

2. A system as claimed in claim 1 wherein said spectrum spreading means takes said incoming data and encodes said data to N parallel paths each storing 1/N data.

3. A system as claimed in claim 2 including means for orthogonally modulating said data from each of said N parallel paths to obtain N modulated data sets, and means for overlaying the resulting modulated data sets on a common path.

4. A system as claimed in claim 3 wherein said means for overlaying arranges said modulated data sets on a same frequency spectrum.

5. A system as claimed in claim 3 wherein said means for an orthogonally modulating data set comprise means for spreading a spectrum by modulating the data with a pseudo random pattern which is itself a binary two-level pattern in a multiplier.

6. A system as claimed in claim 5 wherein said means for modulating pseudo random pattern signal is a pseudo random signal pattern which can be made orthogonal for each of said end data sets.

7. A system as claimed in claim 6 wherein said means for despreading the spectrum of said data includes means for multiplying a same random pattern with a recovered signal in a read channel to recover said data.

* * * * *